US011470836B2

(12) United States Patent
Koziar, Jr. et al.

(10) Patent No.: US 11,470,836 B2
(45) Date of Patent: Oct. 18, 2022

(54) RODENT SNAP TRAP INTERFACED WITH ELECTRONICS MONITORING SYSTEM AND METHOD OF INTERFACING A SNAP TRAP WITH ELECTRONICS MONITORING SYSTEM

(71) Applicant: WOODSTREAM CORPORATION, Lititz, PA (US)

(72) Inventors: Peter Koziar, Jr., Lititz, PA (US); Marko K. Lubic, Shillington, PA (US); Luke Benjamin Haney, Lititz, PA (US); Paul Kletzli, Akron, PA (US); Michael Adamson, Mount Joy, PA (US); Brent David Hardy, Lancaster, PA (US); Cory Blair, Denver, PA (US)

(73) Assignee: Woodstream Corporation, Lancaster, PA (US)

( * ) Notice: Subject to any disclaimer, the term of this patent is extended or adjusted under 35 U.S.C. 154(b) by 486 days.

(21) Appl. No.: 16/518,214

(22) Filed: Jul. 22, 2019

(65) Prior Publication Data

US 2020/0029550 A1 Jan. 30, 2020

Related U.S. Application Data

(60) Provisional application No. 62/703,208, filed on Jul. 25, 2018.

(51) Int. Cl.
*A01M 23/24* (2006.01)
*H04W 4/38* (2018.01)
(Continued)

(52) U.S. Cl.
CPC .......... *A01M 23/245* (2013.01); *A01M 23/30* (2013.01); *H01Q 1/38* (2013.01); *H04W 4/38* (2018.02)

(58) Field of Classification Search
CPC ...... A01M 23/24; A01M 23/30; A01M 23/00; A01M 23/245; H04W 4/38; H01Q 1/38
See application file for complete search history.

(56) References Cited

U.S. PATENT DOCUMENTS 6,137,415 A * 10/2000 Rast ................. G08B 23/00
340/573.2
6,415,544 B1 7/2002 Leyerle et al.
(Continued)

FOREIGN PATENT DOCUMENTS

WO WO 2016/073429 5/2016
WO WO 2017/036480 3/2017
WO 2017149163 A1 9/2017

OTHER PUBLICATIONS

Extended European Search Report, Application No. 19840939.3-1105, dated Jul. 12, 2022, 9 pages.

*Primary Examiner* — Joshua E Rodden
*Assistant Examiner* — Henry Hooper Mudd
(74) *Attorney, Agent, or Firm* — Barley Snyder

(57) ABSTRACT

A snap type rodent trap with remote notification capability is provided. The trap includes a non-conductive base, conductive bail and trigger components, and an electronic PCB assembly mounted on the trap base. According to a first embodiment, the base is wood and the PCB assembly is selectively coated or printed with a layer of a flexible conductive material that contacts bail and trigger wire components mounted on the upper surface of the trap base as well as a conductive strip positioned to be contacted by the bail when the trap is tripped and empty. According to a second embodiment, the base is molded plastic. The PCB assembly in both embodiments is configured to detect and provide remote notification of trap states using the bail as an
(Continued)

antenna. A method of retrofitting a snap type trap with an electronics monitoring system is also provided.

25 Claims, 10 Drawing Sheets

(51) Int. Cl.
*H01Q 1/38* (2006.01)
*A01M 23/30* (2006.01)

(56) References Cited

U.S. PATENT DOCUMENTS

| | | | |
|---|---|---|---|
| 6,508,031 | B1 | 1/2003 | Johnson et al. |
| 6,574,912 | B1 | 6/2003 | Johnson et al. |
| 8,156,683 | B2 | 4/2012 | Slotnick |
| 8,490,322 | B2 | 7/2013 | Dobias et al. |
| 2004/0020100 | A1* | 2/2004 | O'Brien ............. A01M 1/00 43/1 |
| 2008/0204253 | A1 | 8/2008 | Cottee et al. |
| 2009/0151221 | A1 | 6/2009 | Daley |
| 2010/0134301 | A1 | 6/2010 | Borth et al. |
| 2011/0083358 | A1 | 4/2011 | Slotnick |
| 2013/0342344 | A1 | 12/2013 | Kramer et al. |
| 2017/0215407 | A1 | 8/2017 | Pinzone et al. |

* cited by examiner

RODENT SNAP TRAP INTERFACED WITH ELECTRONICS MONITORING SYSTEM AND METHOD OF INTERFACING A SNAP TRAP WITH ELECTRONICS MONITORING SYSTEM

This application claims priority from U.S. provisional application Ser. No. 62/703,208, filed Jul. 25, 2018.

BACKGROUND OF THE INVENTION

Field of the Invention

The present invention is related to the field of pest control and, more particularly, to snap traps having remote monitoring capability.

Description of the Related Art

Traditional wooden rodent traps having a snap-type killing mechanism have been used for years and have proven to be very effective in dispatching mice and rats. However, while simple to use, the basic snap trap must be visually checked on a regular basis to determine trap status, i.e., whether the trap is still set or whether the trap has been tripped with an associated rodent kill or escape, both necessitating that the trap be reset.

Electronic rodent traps have been developed that provide remote monitoring capability. In an effort to bring such capability to traps that utilize a mechanical killing mechanism, plastic traps have been developed that are equipped with a sensor platform involving magnetic or microswitch technology to detect trap status. These sensor platforms are expensive, however, and add significantly to the size of the trap.

Therefore, a need exists for a means of modifying an existing wooden rodent trap that has a snap type killing mechanism to provide remote monitoring capability at a reasonable cost and preferably without modifying the size of the trap. A need also exists for a cost-effective user-friendly plastic snap trap that can wirelessly communicate multiple states and that includes features for improved rodent interaction outcomes.

SUMMARY OF THE INVENTION

In view of the foregoing, the present invention is directed to a rodent trap including a base made of a non-conductive material upon which are mounted the functional components of a snap trap. The conventional snap trap that has been in use for many years has a wooden base and a mechanical "snap type" killing mechanism such as those that have been made commercially available under the VICTOR® trademark for decades. However, the base could be plastic or other non-conductive material.

According to a first embodiment, the present invention is directed to inexpensively interfacing an electronics monitoring system to an existing wooden-base type snap trap to provide remote notification capability. When modified with the electronics monitoring system, the snap trap is able to communicate over a long range wireless network such as LoRa and to transmit status updates to a user including whether 1) the trap is armed; 2) the trap is tripped and contains a rodent; and 3) the trap is tripped but empty.

More particularly, the conventional components of a wooden-base snap type trap include a spring-loaded bail, a trigger wire and a trigger. The bail and bail spring are fastened to the base by staples, with the bail snapping from one side of the trap to the other under the force of the bail spring to catch the rodent. The trigger wire has one end pivotally secured to the base by a fastener and a free end that is caught upon the trigger when the trap is set such that the trigger wire retains the bail, under spring tension, in the set position.

According to the first embodiment of the present invention, the trap is further provided with an electronic printed circuit board (PCB) assembly mounted on the underneath side or bottom of the base and a layer of a flexible conductive substance selectively printed on the PCB assembly. The staples used to secure the bail and the trigger wire are made of a conductive material and extend through the base so as to be in contact with the layer of conductive substance on the PCB assembly mounted on the bottom of the trap. By conductively connecting the bail to the PCB assembly via the staples that secure the bail spring to the wooden base, the bail can act as the antenna for the PCB assembly.

The trap also preferably includes a conductive strip on the upper surface of the trap that extends over the edge on one side of the trap to be in electrical contact with the flexible conductive layer on the bottom of the trap. The portion of the conductive strip on the upper surface of the trap is positioned to be contacted by the bail when the trap is tripped in an empty or "rodent escape" state. In the absence of a conductive strip, or other method of sensing such as a vibration sensor as will be discussed hereinafter, the trap can detect only that the trap is tripped.

As originally manufactured, the trigger wire is secured to the non-conductive base so that it does not come into contact the bail, and is preferably covered by an insulating substance such as plastic tubing, thus keeping the electronics in a low-power or powered down state. When the customer initially arms the trap, the trigger wire is brought into contact with the bail which causes the trap to "wake up" and perform any necessary initialization steps. These initialization steps may include joining a wireless communications network such as a LoRa network, being detected and identified by a remote monitoring system, and the like. Following initialization, the trap then enters a low power or sleep state in which it remains pending interaction with a rodent that trips the trap.

When the trap is tripped, the trigger wire loses contact with the bail. This loss of contact is reported or remotely detectable as a trap tripped state. If the trap was tripped by a rodent and the rodent is caught, the presence of the rodent's body will prevent the bail from making contact with the conductive strip on the upper surface of the trap base. In this state, the trap reports a rodent kill. If, on the other hand, the trap is tripped without catching a rodent, the bail will come into contact with the conductive strip. In this state, the trap reports an empty tripped trap, such as a rodent escape.

To improve the efficacy of the trap against rodent escapes, the front edge of the trap base is preferably provided with a set of teeth made of sheet metal or the like that are tacked onto or otherwise secured to the wooden base. The teeth reduce the likelihood of the rodent being able to wiggle out from under the bail once caught.

To increase the likelihood that rodent interaction with the trap will result in the trap being tripped, the snap trap may include an alternate bait holding structure. In particular, through modification of the trap trigger to include a trip pedal having a hole therein, the trap may be provided with a bait cup and cover that are accommodated within the hole. The bait cup, which is tacked onto the upper surface of the wooden base, holds the bait while the cover partially covers the bait to increase access difficulty, protracting trap interaction times and making it more likely that the trap will be tripped to catch the rodent.

According to a second embodiment of the present invention, the snap trap has a base made of molded plastic with a printed circuit board mounted on or therein that, like the first embodiment, is configured to enable the trap to communicate over a long range wireless network such as LoRa and to transmit trap states including "set", "tripped with no catch", and "tripped with a catch", the plastic base provides the additional advantage of being waterproof to protect the PCB.

Pivotally mounted on the base is a spring-loaded dispatch bail. According to a preferred embodiment, the dispatch bail includes a kill bar and a setting bar that are movable on a pivot axle in a fixed relationship with one another between a set position and a tripped position. The trap is set by pressing down upon the setting bar which elevates the kill bar. When the trap is tripped, the kill bar rotates downward to be in contact with the base. In addition to dispatching the rodent, the kill bar serves as the antenna for the trap, being conductively coupled to a contact on the PCB which presses or is pressed against the pivot axle for the dispatch bail.

To increase rodent holding capability and thereby reduce rodent escape once the trap is tripped, the front and forward-side edges of the plastic trap are molded to include upwardly directed teeth. The teeth restrain the rodent from wiggling out from under the kill bar. The upper surface of the trip pedal, which is a generally planar member having a hole therethrough, is also provided with upwardly directed teeth, preferably arranged along a linear bar that extends substantially parallel with the front edge of the trap. The toothed bar further serves to promote retention of the rodent between the bail and the trap base once the trap is tripped.

The plastic trap further includes a bait cup that is accommodated within the trip pedal hole, the bait cup having an open top that is partially covered by a bait cup cover to make it more difficult for the rodent to access the bait. The increased difficulty of reaching or removing the bait creates a longer lasting rodent interaction with the trip pedal, thus increasing the likelihood of tripping the trap.

As the setting bar is typically made of relatively small diameter wire which is under high spring tension, the upper corners of the setting bar portion of the dispatch bail are provided with finger grips. The finger grips provide a generally flat platform that increases the surface area against which the user's fingers may press when setting the trap, improving user comfort.

Finally, the plastic trap according to the second embodiment of the present invention utilizes sensors in place of a conductive trigger wire to detect the state of the trap. According to a preferred configuration, detection of the "set" state is accomplished using a magnet embedded into one of the finger grips on the setting bar and a magnetic sensor, such as a Hall Effect sensor, magnetoresistive sensor, and the like, mounted on the PCB assembly. The magnet in the finger grip excites the magnetic sensor when the setting bar is in close proximity to the PCB as occurs when the bail is in the set position.

The "trap tripped with no catch" and "tripped with a catch" states are detected using a vibration sensor such as a piezoelectric disk or the like. At an appropriate time after receiving an indication from the magnetic sensor that the trap is no longer in the "set" state, the vibration sensor detects the number and/or nature of the vibration waves created by the bail striking the base of the trap. These vibration waves differ according to whether the bail impacted the trap body directly, i.e., a "trap tripped with no catch" state, or impacted the trap body indirectly through a buffering object, namely a rodent, i.e., a "trap tripped with a catch" state. Detection of these two tripped states using a vibration sensor may also be incorporated within the wooden base trap of the first embodiment.

Accordingly, it is an object of the present invention according to a first embodiment to provide a compact snap type rodent trap having a bail, a trigger wire and a trigger, the trap further including a remote monitoring capability obtained through the mounting of an electronic printed circuit board (PCB) assembly on the bottom of the trap that is selectively coated or printed with a layer of a flexible conductive material that contacts conductive snap type components mounted on the trap base to detect various trap states including trap armed, trap tripped with a kill, and trap tripped but empty.

Another object of the present invention is to provide a snap type rodent trap in accordance with the preceding object in which the rodent trap includes conductive fasteners that separately secure the trigger wire and the bail to the base of the trap with each being in electrical contact with the layer of flexible conductive material on the bottom of the trap.

A further object of the present invention is to provide a snap type rodent trap in accordance with the preceding objects in which the trigger wire is secured to the base and preferably insulated when the trap is manufactured so that the trigger wire does not contact the bail, the trap electronics then being in a low power or powered down mode.

Yet another object of the present invention is to provide a snap type rodent trap in accordance with the preceding objects in which the trigger wire is brought into contact with the bail when the trap is set, this physical contact creating an electrical connection between the bail and the trigger wire which is conducted to the PCB electronics via the flexible layer, causing the trap electronics to wake up in preparation for use.

Still another object of the present invention is to provide a snap type rodent trap in accordance with the preceding objects in which tripping of the trap causes the trigger wire to lose contact with the bail, this loss of contact signaling that the trap has been tripped.

A further object of the present invention is to provide a snap type rodent trap in accordance with the preceding object in which a conductive strip is provided on the upper surface of the trap, the conductive strip being electrically connected with the flexible layer of conductive material printed on the PCB assembly on the bottom of the trap and positioned to be contacted by the bail on the upper surface of the trap when the trap is tripped and empty.

A still further object of the present invention is to provide a snap type rodent trap in accordance with the preceding object in which the layer of flexible conductive material printed on the PCB assembly mounted to the bottom of the trap contacts the portion of the conductive strip that wraps around the trap base at one end thereof.

Yet a further object of the present invention is to provide a snap type rodent trap in accordance with the preceding two objects in which the bail is prevented from contacting the conductive strip when the trap has been tripped with a rodent caught under the bail, the absence of contact between the bail and the conductive strip signaling that the trap has caught a rodent.

Still a further object of the present invention is to provide a snap type rodent trap having a wooden base in accordance with the first embodiment in which a vibration sensor is used to detect the number and/or nature of the vibration waves created by the bail as it either impacted the trap body directly, indicating a "trap tripped with no catch" state, or impacted the trap body indirectly through a buffering object, namely a rodent, indicating a "trap tripped with a catch" state.

Another object of the present invention is to provide a snap type rodent trap in accordance with at least one of the preceding objects in which the trap is a conventional already existing wooden-base rodent snap trap that has been modified by the addition of an electronic printed circuit board (PCB) assembly on the bottom of the trap that is selectively coated or printed with a layer of a flexible conductive material, the flexible conductive material being in electrical contact with the existing conductive fasteners that secure the bail and trigger wire to the wooden base of the snap trap.

Yet another object of the present invention is to provide a snap type rodent trap modified to include a PCB assembly and layer of flexible conductive material in accordance with the preceding object in which the layer of flexible conductive material is in contact with a conductive strip on the upper surface of the trap that is positioned to be in contact with the bail when the trap is tripped and empty, the strip extending over one end of the trap to contact the flexible layer on the bottom of the trap.

Still another object of the present invention is to provide a snap type rodent trap in accordance with at least one of the preceding objects in which the trap includes electrically conductive contacts between the bail and the trigger wire and between the bail and a strip of conductive material on the upper surface of the trap to enable the snap type rodent trap to report trap states of "trap set", "trap tripped/rodent caught" and "trap tripped/empty".

A further object of the present invention is to provide a method of modifying a snap type rodent trap to include remote monitoring capabilities that can be easily and inexpensively implemented while retaining compact trap size and providing robust and effective rodent dispatch in operation.

A still further object of the present invention is to provide a trap having a mechanical set and/or kill mechanism that further includes conductive elements that are configured to provide wireless notification capability of different trap states to a remote monitoring device, the trap states including at least "trap set" and "trap tripped".

Yet a still further object of the present invention is to provide a trap in accordance with the preceding object in which the "trap tripped" notification further identifies between a "trapped tripped/pest caught" state and a "trap tripped/trap empty" state.

Another object of the present invention is to provide a snap type rodent trap in accordance with at least one of the preceding objects in which the bail is conductively connected to the PCB assembly via the staples that secure the bail spring to the wooden base, such that the bail acts as the antenna for the trap.

A further object of the present invention is to provide a snap type rodent trap in accordance with at least one of the preceding objects in which the front edge of the trap base is provided with a set of teeth made of sheet metal or the like that are tacked onto or otherwise secured to the wooden base, the teeth reducing the likelihood of the rodent being able to wiggle out from under the bail once caught.

Still a further object of the present invention is to provide a snap type rodent trap in accordance with at least one of the preceding objects in which the trap trigger is modified to include a trip pedal having a hole therein, the trap being provided with a bait cup and cover that are accommodated within the hole, the bait cup being tacked onto the upper surface of the wooden base and holding the bait while the cover partially covers the bait to increase access difficulty, protracting trap interaction times and making it more likely that the trap will be tripped to catch the rodent.

It is also an object of the present invention according to a second embodiment to provide a snap type rodent trap having a base made of molded plastic with a printed circuit board mounted to or inside the base that enables the trap to communicate over a long range wireless network such as LoRa and to transmit trap states including at least "trap set" and "trap tripped" as detected using sensors, a spring-loaded dispatch bail being pivotally mounted on the base, the dispatch bail including a kill bar and a setting bar that are movable on a pivot axle in a fixed relationship with one another between a set position and a tripped position, the trap being set by pressing down upon the setting bar to elevate the kill bar, the kill bar not only dispatching the rodent but also serving as the antenna for the trap by being conductively coupled to a contact on the PCB, such as a pogo pin connector, which presses against the pivot axle for the dispatch bail.

Still another object of the present invention is to provide a trap in accordance with the preceding object in which the front and forward-side edges of the base of the plastic trap are molded to include upwardly directed teeth that increase rodent holding capability and thereby reduce rodent escape once the trap is tripped.

Yet another object of the present invention is to provide a trap in accordance with the preceding object in which the trap has a trip pedal with the upper surface thereof also provided with upwardly directed teeth, preferably arranged along a linear bar that extends substantially parallel with the front edge of the trap, to further promote retention of the rodent and prevent the rodent from slipping out from under the kill bar through sustained wiggling.

A further object of the present invention is to provide a trap in accordance with at least one of the three preceding objects in which a bait cup secured to the trap base is accommodated within a hole in the trip pedal, the bait cup being provided with a cover that partially covers the bait to make access thereto more difficult, increasing rodent interaction time with the trip pedal and the resulting likelihood of tripping the trap.

Yet a further object of the present invention is to provide a trap in accordance with at least one of the four preceding objects in which the setting bar includes finger grips that increase the surface area against which the user's fingers may press when setting the trap, thereby improving user comfort.

Another object of the present invention is to provide a trap in accordance with at least one of the five preceding objects in which the trap uses magnetic and vibration sensors to detect and wirelessly communicate the state of the trap to the network, the states including "set", "tripped with no catch", and "tripped with a catch", detection of the "set" state being accomplished using a magnet embedded into one of the finger grips on the setting bar and a magnetic sensor mounted on the PCB assembly, the magnet in the finger grips exciting the magnetic sensor when the setting bar is in close proximity to the PCB as occurs when the bail is in the set position.

A further object of the present invention is to provide a snap type rodent trap in accordance with the preceding object in which the "tripped with no catch" and "tripped with a catch" states are detected by a vibration sensor according to the number and/or nature of the vibrations created when the bail is released from the "set" state and impacts the base either directly when the trap is empty or indirectly through the body of a rodent when there is a catch.

Yet another object of the present invention is to provide a snap type rodent trap with remote notification capability that includes a non-conductive trap base, a snap killing mechanism fastened to the trap base, the snap killing mechanism including a trigger element operative with a spring-loaded bail that is pivotally movable on a pivot axle from a set position to a tripped position upon activation of the trigger element, the bail when in the tripped position being spring biased toward the trap base to trap a rodent between the bail and the trap base, an electronic printed circuit board (PCB) assembly mounted on the base and being configured to detect and report trap status states including at least trap armed and trap tripped, and the bail configured to operate as an antenna for wireless transmission of the trap status states through conductive coupling between the bail and the PCB assembly.

As used and claimed herein in connection with both the first and second embodiments, the term "mounted on" to describe the relationship between the PCB assembly and the base includes both external and internal positioning of the PCB assembly relative to the base unless otherwise explicitly specified. Therefore, a PCB assembly simply described as being "mounted on" the plastic base includes embedding of the assembly within the base, as well as securing of the assembly to an external surface of the base, or to an auxiliary element that is secured to the base.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENT

Figure 1:
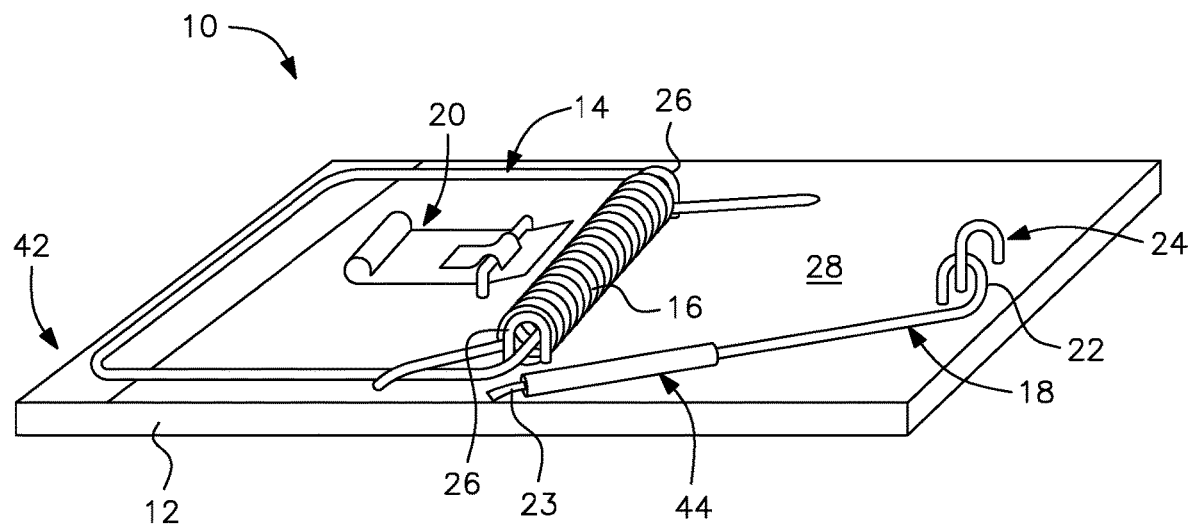
FIG. 1 is a perspective view of a snap trap interfaced with an electronics monitoring system in accordance with a first embodiment of the present invention.

It is to be understood that the embodiments described herein are disclosed by way of illustration only. It is not intended that the invention be limited in its scope to the details of construction and arrangement of components set forth in the following description or illustrated in the drawings. Also, in describing a preferred embodiment, specific terminology will be resorted to for the sake of clarity. It is to be understood that each specific term includes all technical equivalents which operate in a similar manner to accomplish a similar purpose.

As shown in FIG. 1, according to a first embodiment the present invention is directed to a snap type rodent trap generally designated by reference numeral 10. The trap 10 includes a base 12, a bail 14 including a bail spring 16, a trigger wire 18 and a trigger 20. The trigger wire 18 has a secured end 22 pivotally secured to the base 12 by a fastener 24 and a free end 23 that is caught upon the trigger 20 when the trap is set.

As is known in conventional rodent snap traps, the bail spring 16, which is also fastened to the base 12 by at least one fastener 26, applies tension to the bail 14. When the trap is set with the free end 23 of the trigger wire 18 held under the trigger 20 (see FIG. 4B), the trigger wire 18 retains the bail 14 under spring tension on one side of the spring 16 on the upper surface 28 of the trap. When the trap is tripped by releasing the free end of the trigger wire from the trigger 20, the bail snaps to the other side of the spring, hopefully pinning a rodent against the base (see FIG. 4C).

Figure 2:
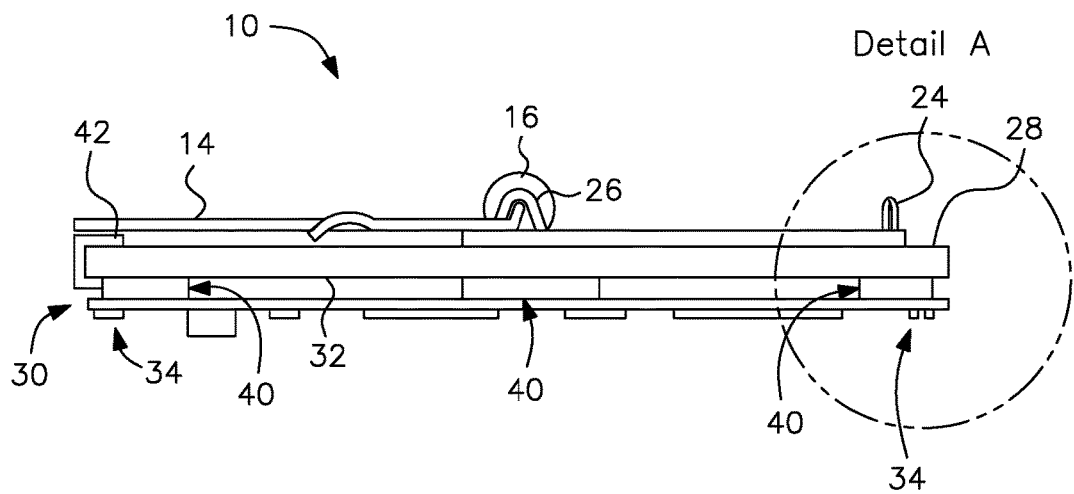
FIG. 2 is a side view of the snap trap shown in FIG. 1.
Figure 2A:
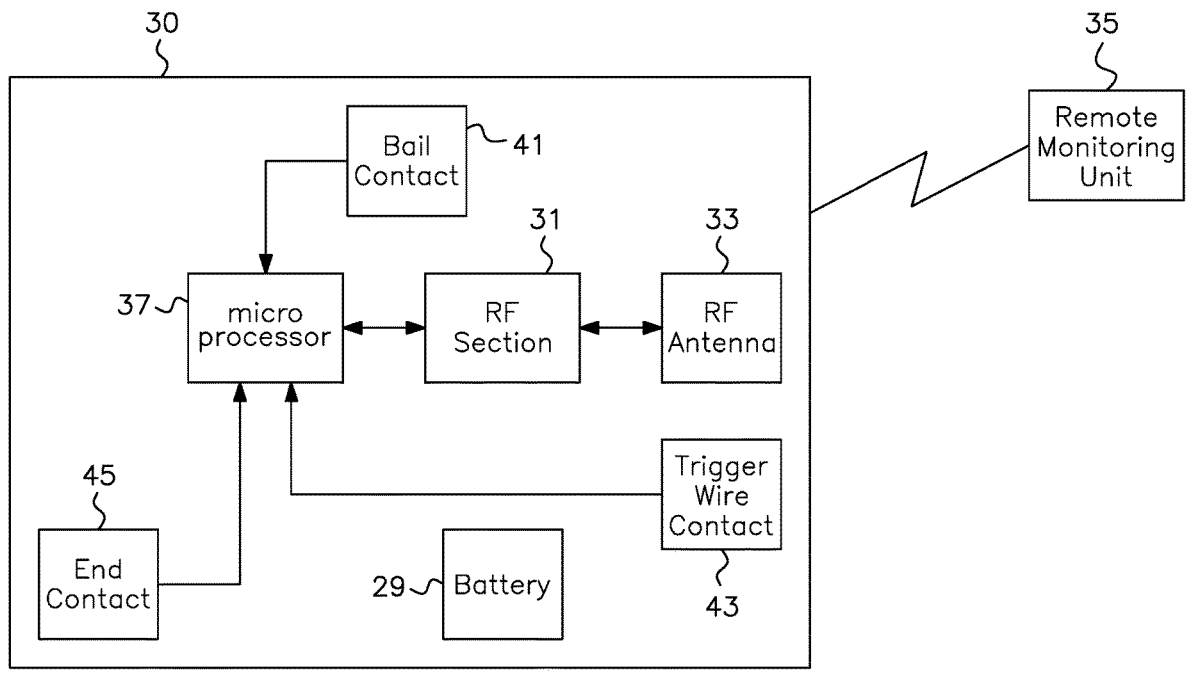
FIG. 2A is a conceptual schematic showing a representative layout of the PCB assembly shown in FIG. 2.

As shown in FIG. 2, the snap trap according to the present invention further includes an electronic printed circuit board (PCB) assembly 30 secured to the underneath side or bottom surface 32 of the trap base 12 by mounting hardware 34 so as to fit within the footprint of the existing trap base, such as that of a conventionally made snap trap. A representative layout of the PCB assembly 30 with battery 29 and including an RF section 31 and RF antenna 33 for wireless communication with a remote monitoring unit 35 is provided in FIG. 2A. A microprocessor 37 is in communication with the RF section 31 and also with bail, trigger wire and conductive strip contacts 41, 43 and 45, respectively.

According to the preferred embodiment shown, the base is made of wood and the mounting hardware 34 includes wood screws. However, the base may be made of any non-conductive material including wood, plastic or the like with the mounting hardware being selected to suit the base material. The fasteners 24 and 26 are made of conductive material, such as metal staples, and extend from the upper surface 28 of the trap base to or near the bottom surface 32 of the base. Alternatively to an underneath side mounting, the PCB assembly 30 could be mounted to extend beyond the base of the trap to allow mounting of electronics that do not fit within the footprint of the wooden trap but this is not the preferred embodiment.

Selectively printed on the PCB assembly 30 is a flexible layer 40 made of a conductive substance. By "selectively printed" it is meant that the layer covers at least selected areas of the PCB assembly. In particular, the flexible layer 40 covers and is in contact with the lower ends of the conductive fasteners 24 and 26. Through these contacts, as well as contact between the flexible layer 40 and the bail and trigger wire contacts 41 and 43, the PCB assembly of the trap can detect when the trigger wire is in contact with the bail, indicating that the trap is set.

Figure 3:
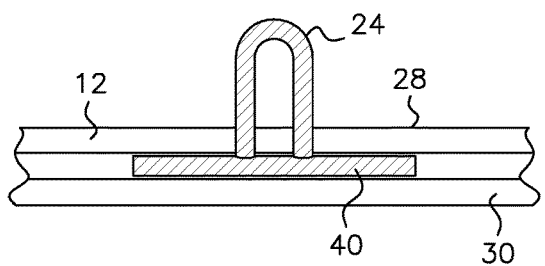
FIG. 3 is an enlarged cross-sectional end view of Detail A of FIG. 2.

The layer 40 may be made of conductive silicone or other flexible conductive material that can adequately contact the PCB and preferably that, when subjected to the pressure of the mounting hardware 34, will be deformed and flow into the staple holes of fasteners 24, 26 to correct any misalignment of the staple ends and ensure good electrical contact as shown in FIG. 3. More particularly, according to a preferred embodiment the bail and trigger wire are mounted to the wooden base via staples that extend through the wood to the bottom of the trap. While the staple points may not fully extend to the bottom of the wood, the flexibility of the conductive substance allows it to flow into the staple holes and contact the points of the staples.

The upper surface 28 of the trap base is preferably further provided with a conductive strip 42. The conductive strip 42 is positioned to be contacted by the bail when the trap is tripped in an empty or "rodent escape" state (see FIGS. 1 and 4D). The conductive strip 42 may be formed by adhesive copper tape that is attached to the upper surface and that extends over the edge of the trap to contact the conductive layer 40 which, in turn, is in contact with the conductive strip contact 45. The conductive strip may be alternatively formed by an extended end of the flexible layer 40 that wraps up and over one end of the trap.

Figure 4A:
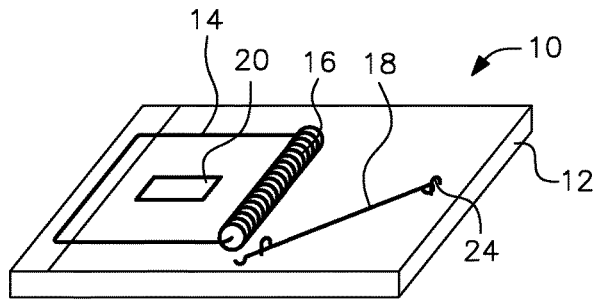
FIG. 4A is a perspective view of a trap like that shown in FIG. 1, as manufactured.

As shown in FIG. 4A, when the trap is originally manufactured, the trigger wire is secured to the non-conductive base so that it does not come into contact the bail, thus keeping the electronics in a low-power or powered down state. Preferably, an insulating substance such as plastic tubing 44 (see FIG. 1) is placed over the free end of the trigger wire 18 to ensure that the trigger wire will not contact the bail or bail spring until the trap is armed for use.

Figure 4B:
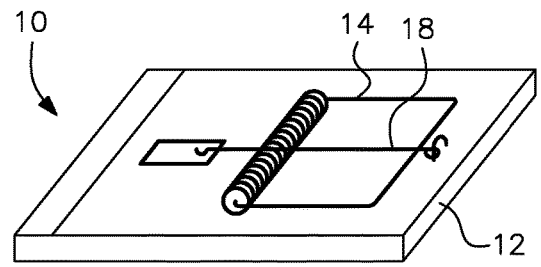
FIG. 4B is a perspective view of the trap shown in FIG. 4A, as armed.

When the customer initially arms the trap, the bail 14 is moved to the set position and held by the trigger wire 18, thus bringing an uninsulated portion of the trigger wire into contact with the bail as shown in FIG. 4B. This contact causes the trap to "wake up" and perform any necessary initialization steps. These initialization steps may include joining a wireless communications network, being detected and identified by a remote monitoring system, and the like. Following initialization, the trap then enters a low power or sleep state. According to a preferred embodiment, the trap will thereafter "wake up" on a periodic basis, such as once or twice per day, to send status reports to a remote monitoring station, while sleeping in between to conserve power usage.

Figure 4C:
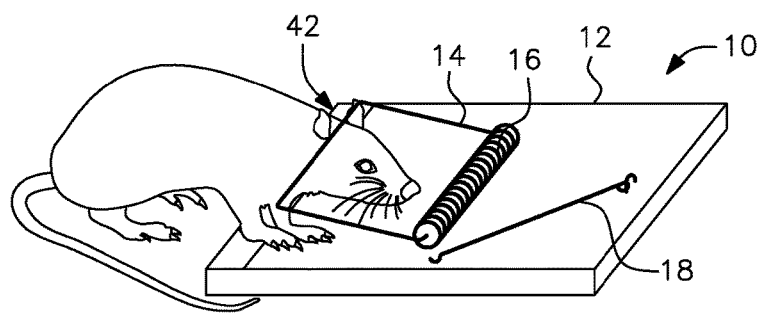
FIG. 4C is a perspective view of the trap shown in FIG. 4B, after having been tripped and with a rodent caught.
Figure 4D:
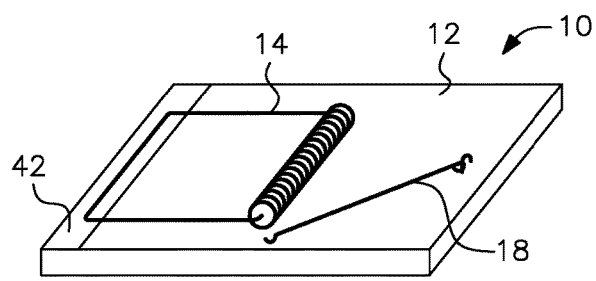
FIG. 4D is a perspective view of the trap shown in FIG. 4B, after having been tripped and without a rodent being caught.

When the trap is tripped, the trigger wire 18 loses contact with the bail 14. This loss of contact is reported or remotely detectable as a trap tripped state. If the trap was tripped by a rodent and the rodent is caught as shown in FIG. 4C, the presence of the rodent's body will prevent the bail from making contact with the conductive strip 42 on the upper surface 28 of the trap base 12. In this state, the trap reports a rodent kill. If, on the other hand, the trap is tripped without catching a rodent, as shown in FIG. 4D, the bail will come into contact with the conductive strip. In this state, the trap reports an empty tripped trap, such as would occur if a rodent, while tripping the trap, manages to escape.

Figure 5:
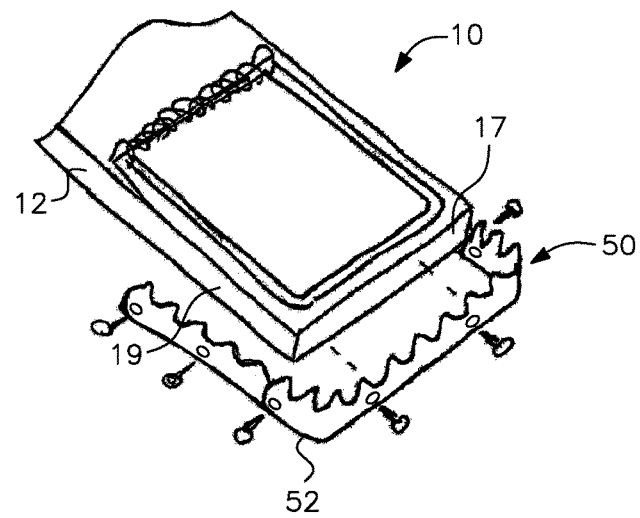
FIG. 5 is a partial perspective view of the front end of a trap like that shown in FIG. 1 being fitted with a set of teeth on the wooden base.

To reduce the likelihood of rodent escape, the front edge 17 and forward side edges 19 of the trap base 12 are preferably provided with a set of teeth generally designated by reference numeral 50 as shown in FIG. 5. The teeth 50 are preferably made using a strip of sheet metal 52 or the like that is tacked onto or otherwise secured to the wooden base. The teeth 50 reduce the likelihood of the rodent being able to wiggle out from under the bail once caught. As used herein, "front" and "forward" refer to the end of the trap that catches a rodent.

As has been described herein, the present invention is directed to a snap type rodent trap in which the trap includes electrically conductive contacts between the bail and the trigger wire and between the bail and a strip of conductive material on the upper surface of the trap to enable the snap type rodent trap to report trap states of "trap set", "trap tripped/rodent caught" and "trap tripped/empty".

More broadly, the present invention includes a trap having a mechanical set and/or kill mechanism and that is further provided with conductive elements that enable the trap to detect and wirelessly communicate different trap states to a remote monitoring device, the trap states including at least "trap set" and "trap tripped". The conductive elements preferably include a conductive strip on the upper surface of the trap that contacts the bail when the trap is tripped and empty, and electrical contacts between the fasteners used to secure the bail and trigger wire to the trap base and a flexible conductive layer mounted on the underside of the trap base. If configured without the conductive strip, the trap can report "trap set" and "trap tripped" states while the presence of the conductive strip adds the ability to distinguish between the states of "trap tripped and empty" and "trap tripped with a rodent". Alternatively, the wood-base trap may be equipped with a vibration sensor to detect the two trap-tripped states.

The present invention is also directed to a method of modifying a conventional wood-base snap type rodent trap to include a remote monitoring capability by adding an electronics PCB assembly to the bottom of the trap. The electronics PCB assembly is selectively printed with a layer of flexible material such as conductive silicone rubber RTV (room temperature vulcanization) and secured to the base of the trap with mounting hardware. With such modification, which can be done easily and inexpensively, the trap retains its compact size and efficient manner of operation while adding remote monitoring and notification capabilities for enhanced operational efficiency.

In an alternate configuration of the first embodiment, the snap type trap of the present invention may be configured to have the fastener that secures the trigger to the base ("the trigger fastener") in electrical contact with the flexible layer on the PCB assembly. With this configuration, contact between the free end of the trigger wire and the trigger fastener can be used to indicate the "trap set" state rather than, or in addition to, contact between the trigger wire and the bail through their respective fasteners.

Figure 6:
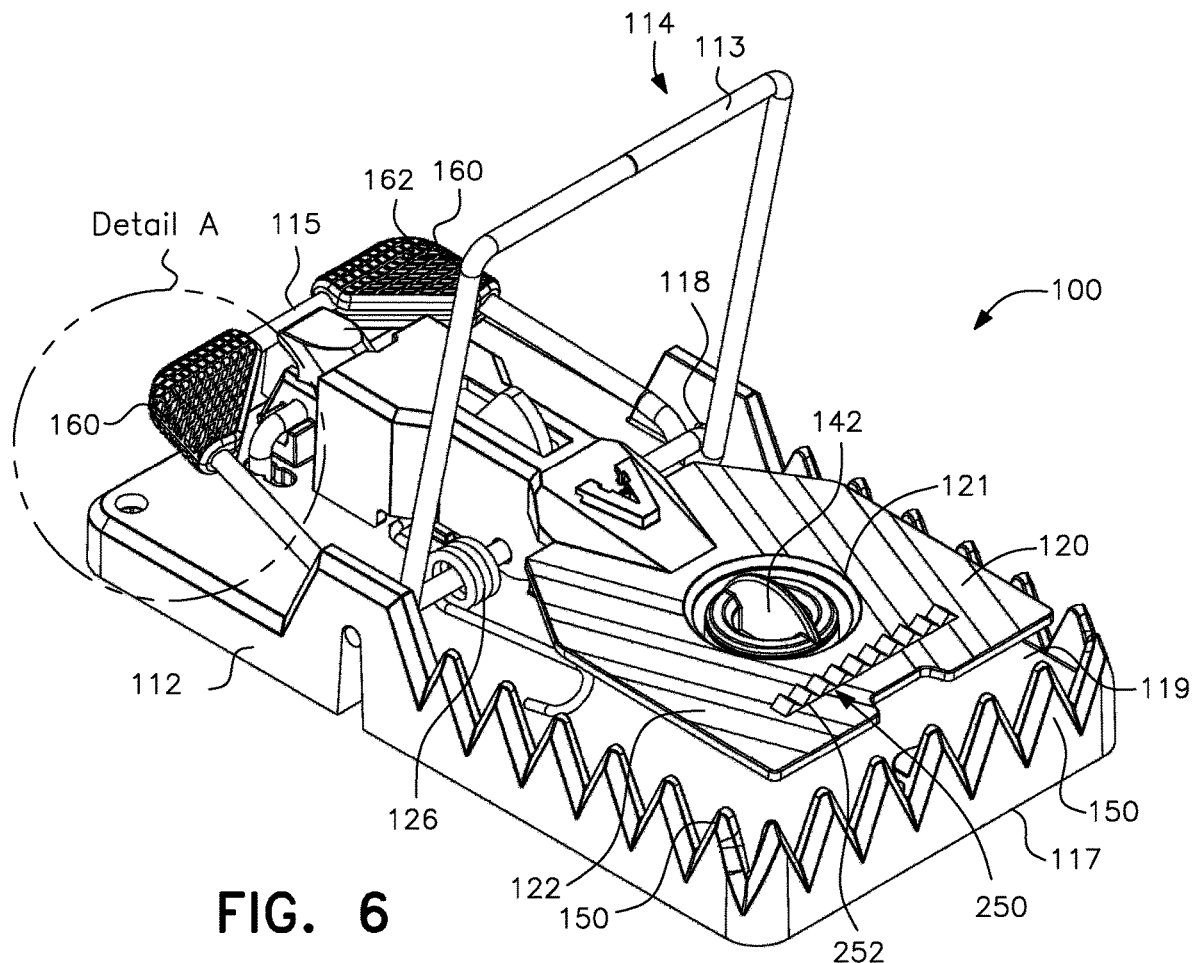
FIG. 6 is a perspective view of a molded plastic snap trap interfaced with an electronics monitoring system in accordance with a second embodiment of the present invention in which the trap is shown in the set position.

According to a second embodiment, the present invention is directed to a molded plastic snap trap shown in FIG. 6 and generally designated by reference numeral 100. The snap trap 100 has a base 112 made of molded plastic that encloses a printed circuit board assembly (not shown). Like the first embodiment, the PCB assembly enables the trap to communicate over a long range wireless network and to transmit trap states including "set", "tripped with no catch", and "tripped with a catch" to the user. The plastic base 112 also provides the additional advantage of being waterproof to protect the PCB.

Figure 7:
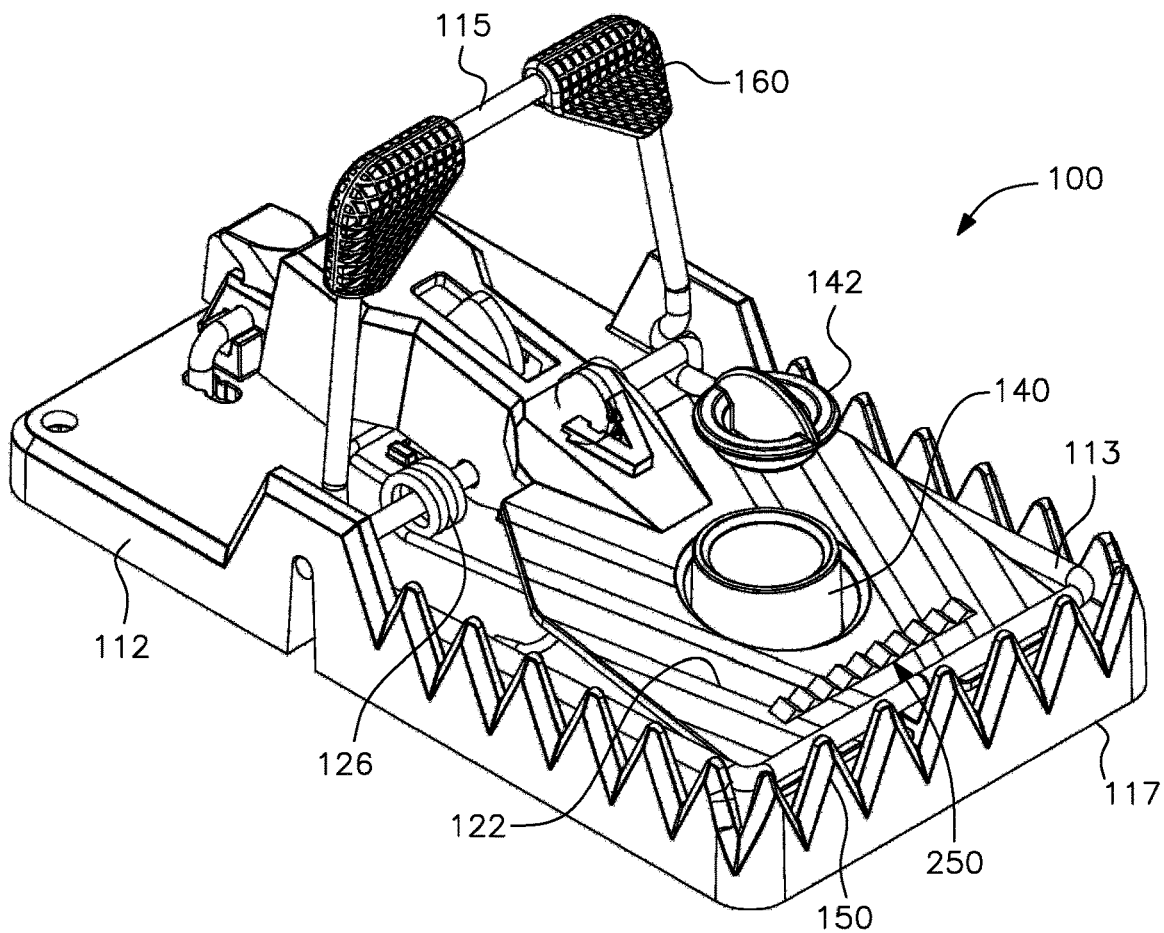
FIG. 7 is a perspective view of the trap shown in FIG. 6 in the tripped position with the bait cover and cup in exploded view.

Pivotally mounted on the base 112 is a spring-loaded dispatch bail generally designated by reference numeral 114. The dispatch bail 114 includes a kill bar 113 and a setting bar 115 that are movable on a pivot axle 118 in a fixed relationship with one another between a set position and a tripped position. The trap 100 is set by pressing down upon the setting bar 115 which elevates the kill bar 113 as shown in FIG. 6. When the trap is tripped as shown in FIG. 7, the kill bar rotates downward to be in contact with the base 112 while the setting bar 115 is lifted up through its fixed relationship with the kill bar 113.

Figure 8:
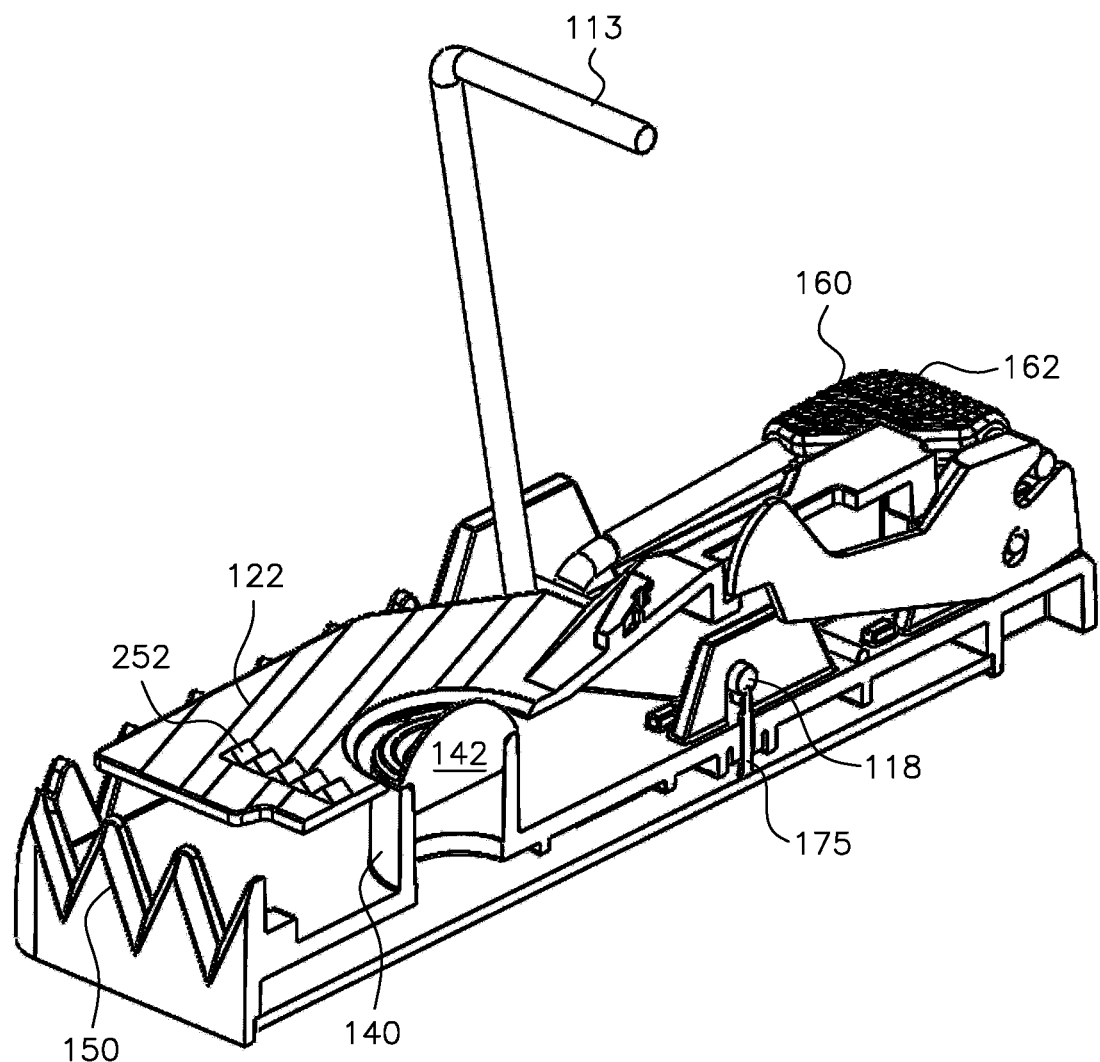
FIG. 8 is a cut-away side perspective view of the plastic molded trap of FIG. 6, showing the pogo pin connector electrically coupling the PCB assembly and the pivot axis of the bail.

In addition to dispatching the rodent, the kill bar 113 serves as the antenna for the trap. More particularly, the kill bar is conductively coupled to a contact, such as a pogo pin connector 175 or the like, on the PCB which is pressed against the pivot axle 118 of the dispatch bail 114 as shown in the cut-away view of FIG. 8. Other structural components suitable for creating a conductive coupling could also be used such as a brass leaf spring, a soldered connection, or the like.

To increase rodent holding capability and thereby reduce rodent escape once the trap is tripped, the front edge 117 and forward-side edges 119 of the plastic trap are preferably molded to include upwardly directed teeth 150. The teeth restrain the rodent from slipping out from under the kill bar 113 through sustained wiggling.

The trigger element of the trap 100 includes a trip pedal 120 having a hole 121 therethrough. The upper surface 122 of the trip pedal 120 is also provided with upwardly directed teeth generally designated by reference numeral 250, preferably arranged along a linear bar 252 that extends substantially parallel with the front edge 117 of the trap. The toothed bar 252 further serves to promote retention of the rodent between the kill bar 113 of the bail 114 and the trap base 112 once the trap is tripped.

The plastic trap 100 further includes a bait cup 140 that is accommodated within the trip pedal hole 121. The bait cup 140 has an open top, as shown in the partially exploded view of FIG. 7, that is partially covered by a bait cup cover 142. The bait cup cover, which is preferably kept in place within the open top by an interference fit, makes it more difficult for the rodent to access the bait. The increased difficulty of reaching or removing the bait creates a longer lasting rodent interaction with the trip pedal 120, thus increasing the likelihood of tripping the trap.

The wooden snap trap 10 according to the first embodiment may also be configured to include a bait cup 140 and cover 142 to provide an alternate bait holding structure. In particular, through modification of the trap trigger element to include a trip pedal having a hole therein, substantially like that shown in FIG. 6, the trap 10 may be provided with a bait cup and cover that are accommodated within the hole. The bait cup, which is tacked onto the upper surface 28 of the wooden base 12, holds the bait while the cover partially covers the bait to increase access difficulty in like manner as the bait cup and cover as just described in connection with the plastic trap according to the second embodiment.

As the setting bar 115 of the plastic trap 100 is typically made of relatively small diameter wire which is under high spring tension by spring 126, the upper corners of the setting bar are preferably provided with finger grips 160. The finger grips 160 include a generally flat platform 162 that increases the surface area against which the user's fingers may press when setting the trap, improving user comfort.

Finally, the plastic trap 100 according to the second embodiment of the present invention uses one or more sensors to detect the state of the trap.

Figure 6A:
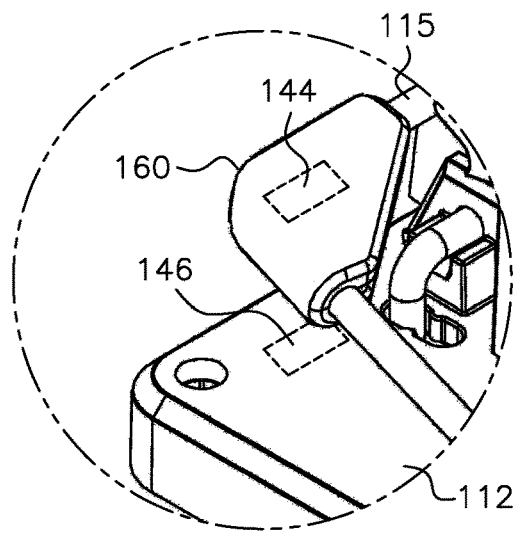
FIG. 6A is an enlarged view of Detail A of FIG. 6.

According to a preferred configuration, detection of the "set" state is accomplished using a magnet 144 embedded into one of the finger grips 160 on the setting bar 115 and a magnetic sensor 146 mounted on the PCB assembly as shown in FIG. 6A. The magnet 144 in the finger grips 160 excites the magnetic sensor 146 when the setting bar is in close proximity to the PCB as occurs when the bail is in the set position. The magnetic sensor 146 may be embodied as a Hall Effect sensor, a magnetoresistive sensor, a reed switch, and the like.

Figure 9:
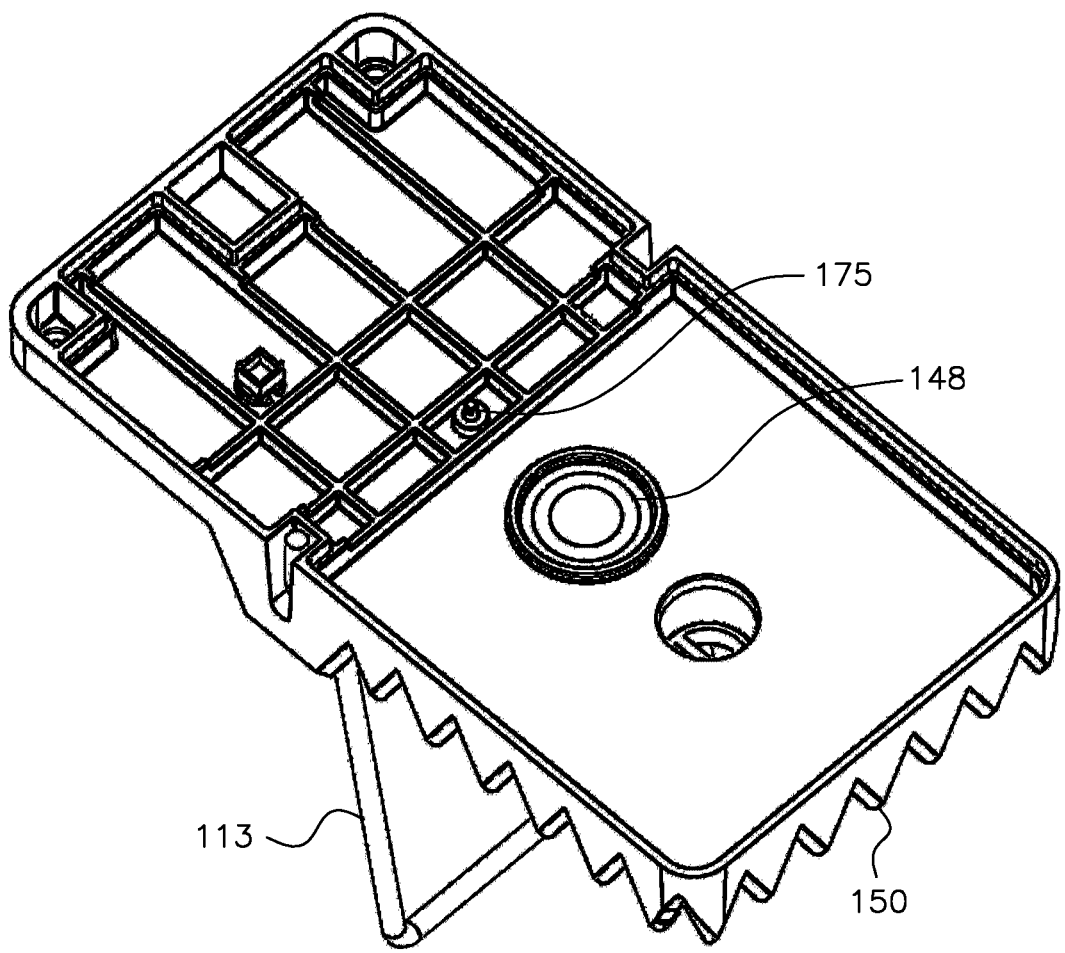
FIG. 9 is a bottom perspective view of the plastic molded trap of FIG. 6 with the exterior panel removed to show the vibration sensor mounted on the base as well as the pogo pin connector of FIG. 8.
Figure 10:
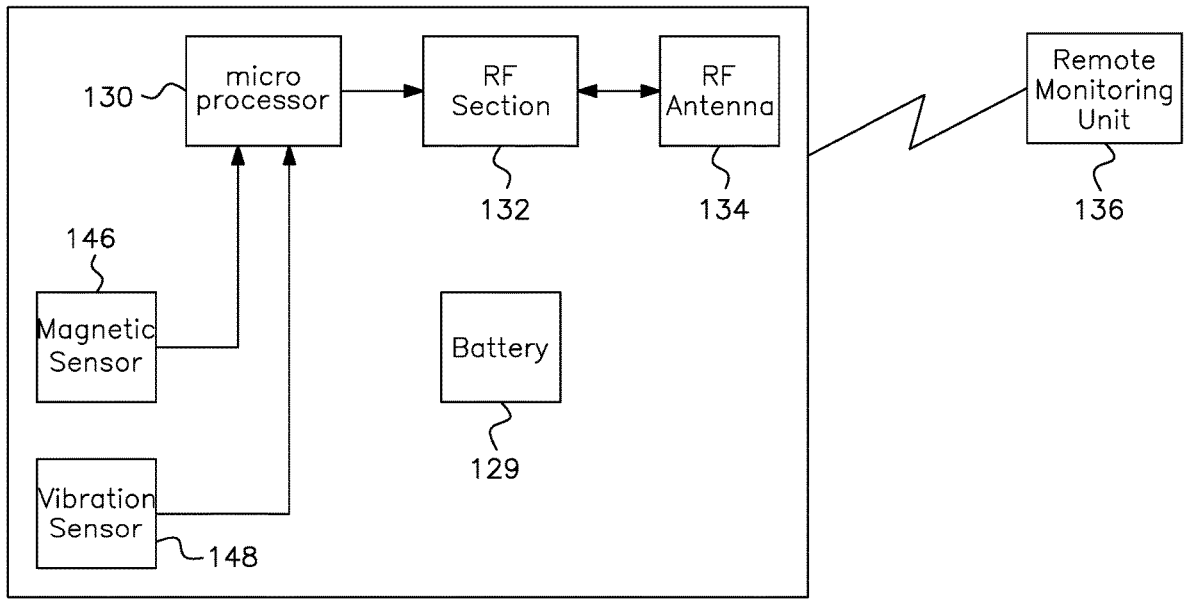
FIG. 10 is a block diagram of the sensing, control and communication components of a network-connected snap trap according to the second embodiment.

The "trap tripped with no catch" and "trap tripped with a catch" states are detected using a vibration sensor 148, which may be embodied as a piezoelectric element, mounted on the base of the trap as shown in FIG. 9. The vibration sensor 148 and the magnetic sensor 146 are coupled to the microprocessor 130 on the PCB assembly which is powered by battery 129 and communicates through an RF section 132 and RF antenna 134 to a remote monitoring unit 136 as shown in FIG. 10.

The vibration sensor may be mounted externally or embedded inside the base so long as the mounting provides a firm attachment to the trap body to enable the sensor to monitor trap vibration when tripped. Specifically, when the trap is tripped from the "set" state, the bail moves rapidly through an arc and firmly impacts either the trap body itself, or the body of a rodent that is caught between the bail and the trap body.

If there is no rodent such that the bail impacts the trap body directly, the rigidity of the trap body, whether it is wooden or plastic, and the springiness of the bail cause the bail to resonate in such a way that the bail imposes high-frequency vibration waves upon the body of the trap. These vibration waves are detected by the sensor 148 which generates a series of pulses corresponding to each cycle of the waveform. The waveform and the number of pulses differ depending upon whether or not a rodent was caught.

Figure 11:
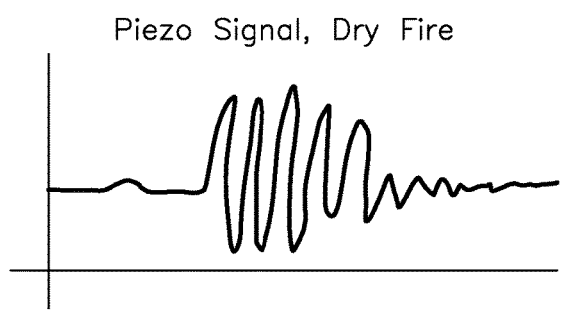
FIG. 11 is a graph showing the signal generated by the vibration sensor when the trap is tripped without catching a rodent.

More particularly, when the bail impacts the trap body directly, a number of pulses are generated by the vibration sensor as shown in FIG. 11. If the pulse count for this series of pulses exceeds a threshold number, the electronics on the PCB assembly that monitor the vibration sensor report that a "dry fire" occurred, i.e., that a trap activation occurred without a rodent being caught.

Figure 12:
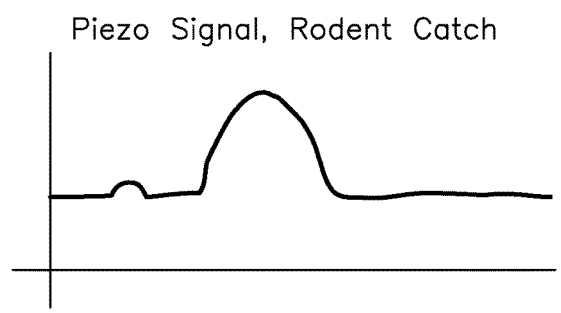
FIG. 12 is a graph showing the signal generated by the vibration sensor when the trap is tripped with a rodent caught.

A different result occurs, however, when a rodent is present when the trap is tripped such that the bail does not impact directly on the body of the trap. While a pulse is detected, the intervening body of the rodent serves to dampen the vibrations so that the vibration sensor 148 only detects the overall impact and generates fewer pulses as shown in FIG. 12. In response to a single pulse waveform like that shown in FIG. 12, the electronics on the PCB assembly that monitor the vibration sensor report that a rodent has been successfully caught.

Figure 13:
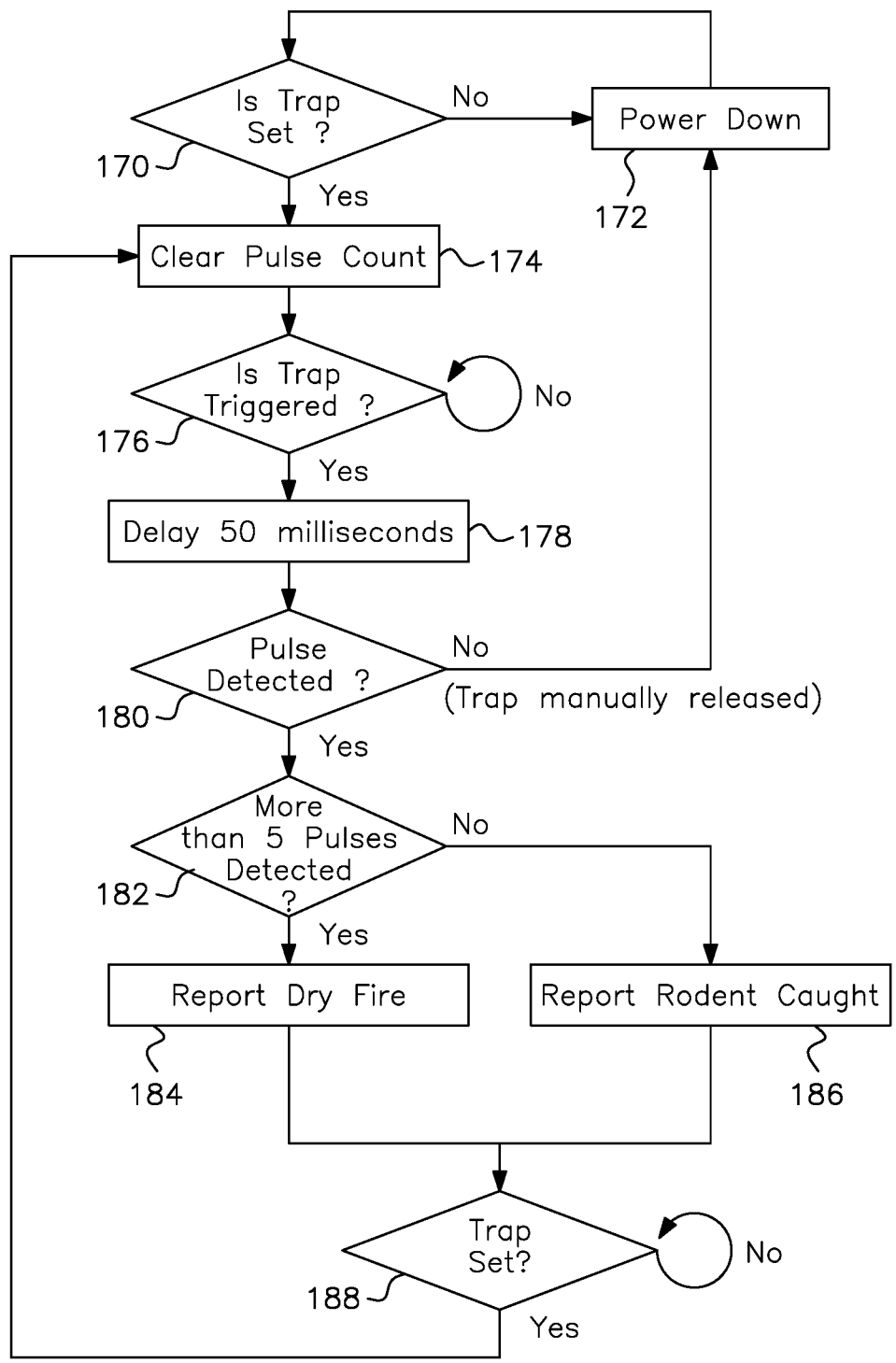
FIG. 13 is a flow chart of the steps undertaken by the trap shown in FIG. 9 to determine whether the vibrations detected when the trap is tripped indicate that a rodent has been caught or that the trap was tripped without catching a rodent.

A flow chart of the foregoing logic steps undertaken by the trap to determine whether or not a rodent has been caught is set forth in FIG. 13. First, the trap must be set. If the trap is not set, step 170, the trap enters a sleep state, step 172. Upon setting of the trap, step 170, any pulse count stored from a previous trap activation is cleared, step 174, and the trap enters an active standby mode, step 176.

Once the trap is tripped or triggered, step 176, the trap waits for a delay time, step 178. The delay time 178 is a time sufficient for the bail to travel from the set position to impact either the rodent or the trap body. According to a preferred embodiment, the delay time is on the order of 50 milliseconds.

After the delay time, the trap looks for pulses from the vibration sensor indicating vibration waves were received. If no pulses are received, step 180, the trap concludes that the user of the trap has manually released the bail and gradually closed the trap in order to remove the trap from service. In this case, the trap returns to the sleep state.

If pulses are received, step 180, the trap determines the absence of a rodent according to whether more than a threshold number of pulses were received during the 50 millisecond delay time, step 182. According to a preferred embodiment, the threshold number of pulses is 5. Hence, if 5 or more pulses were received, step 182, the trap reports a "dry fire" condition, step 184, which indicates that no rodent was caught.

If the number of pulses received during the 50 millisecond delay time is less than 5 but more than zero and therefore does not meet the threshold, step 182, the trap reports that a rodent has been successfully caught, step 186. The trap then remains in a semi-active state and waits to be set again, step 188. Once the trap is set, step 188, the pulse count from the previous trap activation is cleared, step 174, and the logic sequence shown in FIG. 13 is repeated.

To summarize, after an appropriate delay time following receipt of an indication from the magnetic sensor or other appropriate method that the trap is no longer in the "set" state, the trap checks to see whether the number of pulses generated by the vibration sensor in response to the bail impacting the trap body is consistent with a "trap tripped with no catch" state, or a "trap tripped with a catch" state.

As described herein, the present invention is thus directed to a snap type rodent trap with long range wireless remote notification capability that includes a non-conductive trap base, a snap killing mechanism fastened to the trap base and including a trigger element operative with a spring-loaded bail that is pivotally movable on a pivot axle from a set position to a tripped position upon activation of the trigger element, the bail when in the tripped position being spring biased toward the trap base to trap a rodent between the bail and the trap base, an electronic printed circuit board (PCB) assembly mounted on the base and being in electrical contact with the bail, the PCB assembly configured to detect and report trap status states including at least trap armed and trap tripped. The snap type rodent trap further includes one or more of: 1) the bail being configured to operate as an antenna for wireless transmission of the trap status states through conductive coupling between the bail and the PCB assembly; 2) the bail being a wire element and the front edge of the trap base having upwardly directed teeth; 3) the trap having a bait cup with a cover that restricts access to bait in the bait cup; and 4) the bail including a kill bar and a setting bar movable in a fixed relationship with one another, the setting bar having finger grips for enhanced user comfort when setting the trap.

Figure 14A:
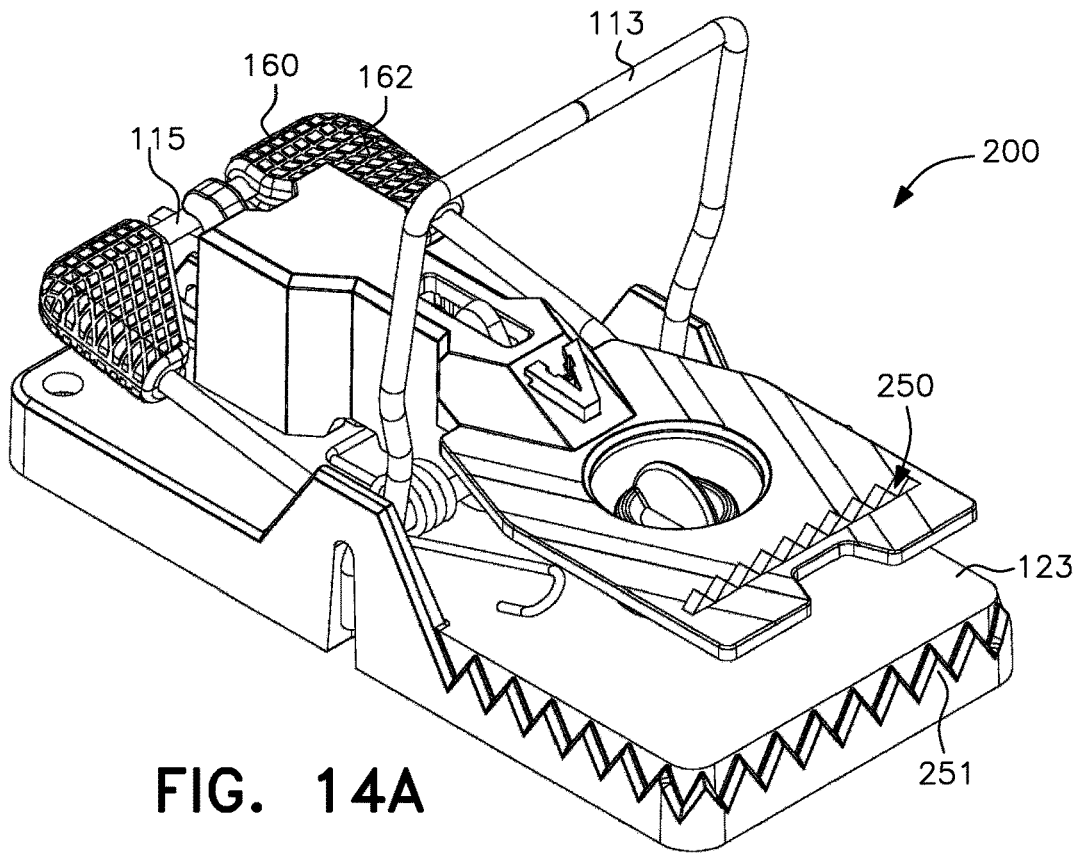
FIG. 14A is a perspective view of a mouse version of the trap shown in FIG. 6, the trap being in the set position.
Figure 14B:
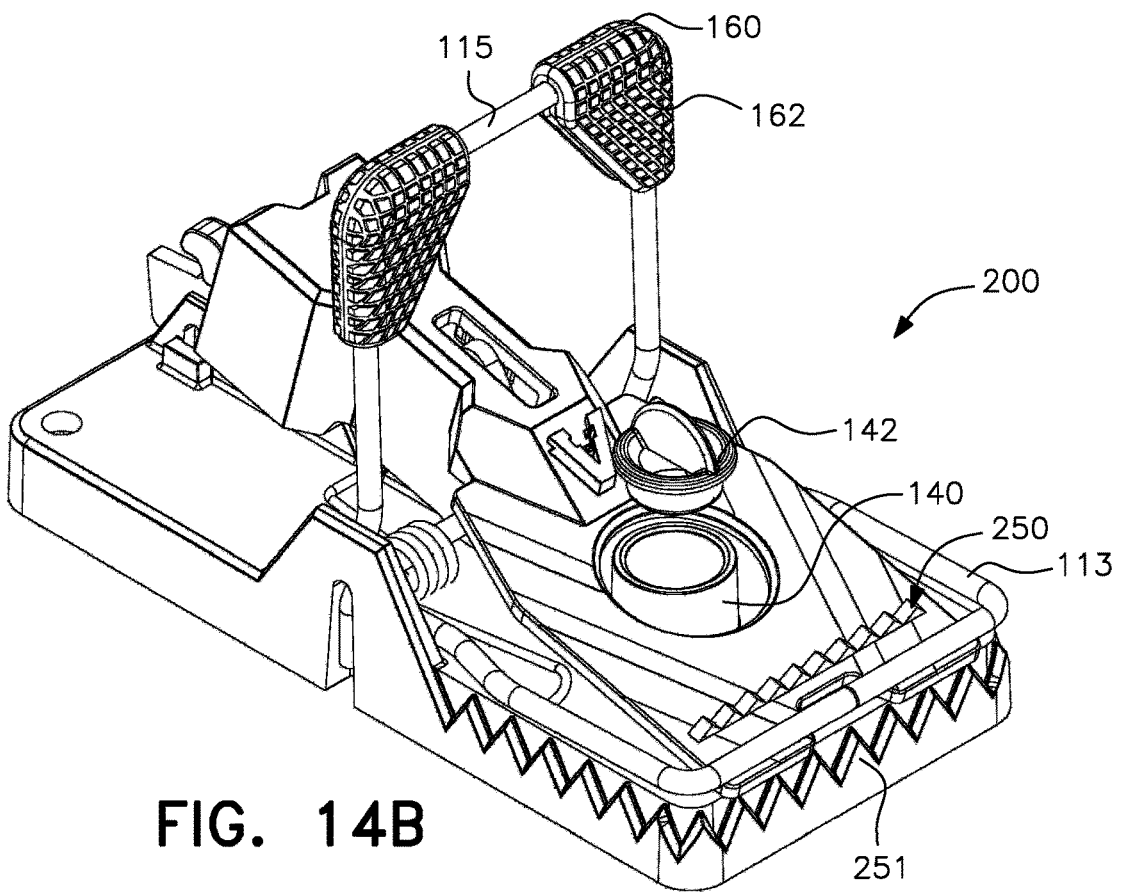
FIG. 14B shows the trap of FIG. 14A in the tripped position with the bait cover and cup in exploded view.

The present invention is also directed to a smaller version of the trap shown in FIGS. 6-9 for use with mice. The mouse trap, generally designated by reference numeral 200, is shown in the set position in FIG. 14A and the tripped position in FIG. 14B. FIG. 14B is also partially exploded to better illustrate the bait cup 140 and bait cover 142. The mouse trap 200 has components generally corresponding with those already described in connection with the rodent trap 100 and therefore a description thereof will not be repeated. However, the teeth at the front edge of the trap are "faux" teeth 251, having their peaks either flush with or below the upper surface 123 of the base 112. The faux teeth 251 are not functional but provide visual commonality with the teeth 250 of the larger trap to achieve the same overall appearance.

The foregoing descriptions and drawings should be considered as illustrative only of the principles of the invention. The invention may be configured in a variety of shapes and sizes and is not limited by the dimensions of the preferred embodiment. Therefore, it is not desired to limit the invention to the specific examples disclosed or the exact construction and operation shown and described. Rather, all suitable modifications and equivalents may be resorted to, falling within the scope of the invention.

What is claimed is:

1. A snap type rodent trap with remote notification capability comprising:
   a non-conductive trap base;
   a snap killing mechanism fastened to the trap base, the snap killing mechanism including a trigger element operative with a spring-loaded bail that is pivotally movable on a pivot axle from a set position to a tripped position upon activation of the trigger element, the bail when in the tripped position being spring biased toward the trap base to trap a rodent between the bail and the trap base;
   an electronic printed circuit board (PCB) assembly mounted on the base and being in electrical contact with the bail, the PCB assembly detecting trap status states including at least trap armed and trap tripped and transmitting said status states over a wireless network; and
   the bail being conductively coupled to the PCB assembly and configured to operate as an antenna for said wireless transmission of said trap status states.

2. The trap as set forth in claim 1, wherein the non-conductive trap base is a molded plastic base and the PCB assembly includes a contact that is pressed against the pivot axle of the bail to achieve the conductive coupling between the bail and the PCB assembly for the antenna operation of the bail.

3. The trap as set forth in claim 2, wherein the trigger element includes a trip pedal having a hole, said trap including a bait cup mounted on the base and accessible through the hole in the trip pedal when the trap is in the set position, an open top of the bait cup being partly covered by a bait cup cover to restrict access to bait held within the bait cup.

4. The trap as set forth in claim 2, wherein the spring-loaded bail includes a kill bar and a setting bar that are movable on the pivot axle in a fixed relationship with one another between the set position and the tripped position, the trap being set by pressing down upon the setting bar to elevate the kill bar above the trip pedal, the setting oar including finger grips to improve user comfort and prevent slippage when setting the trap.

5. The trap as set forth in claim 4, wherein the trap uses magnetic switching to detect a set state of the trap, the PCT assembly having a magnetic sensor mounted thereon and one of the finger grips having a magnet embedded therein, the magnet in the finger grip exciting the magnetic sensor when the setting bar is in close proximity to the PCB as occurs when the bail is in the set position.

6. The trap as set forth in claim 5, wherein the trap includes a vibration sensor that generates a pulse output, said PCB assembly configured to identify between a "trapped tripped/pest caught" state and a "trap tripped/trap empty" state based on said pulse output.

7. The trap as set forth in claim 1, wherein the bail is a wire bar and further comprising upwardly directed teeth on a front edge and side edges adjoining the front edge of the trap base, the teeth improving rodent holding capability when the trap is tripped with a rodent trapped between the bail and the trap base.

8. The trap as set forth in claim 7, wherein the trigger element includes a trip pedal, said pedal being provided with an additional set of upwardly directed teeth.

9. The trap as set forth in claim 1, wherein the non-conductive trap base is a wood base and the pivot axle is mounted on the wood base using conductive fasteners, the PCB assembly being mounted on an underside of the wood base and having a layer of a flexible conductive substance selectively printed thereon, the layer of conductive substance being electrical contact with the bail through the conductive fasteners for the antenna operation of the bail.

10. The trap as set forth in claim 9, wherein the trigger element includes a trigger wire and a trigger, each made of conductive material and fastened to the trap base by conductive fasteners embedded in the trap base, the layer of conductive substance being in electrical contact with the bail and the trigger wire through the conductive fasteners to detect and report trap status states including at least trap armed and trap tripped.

11. The trap as set forth in claim 10, wherein the trap further includes a conductive strip on an upper surface of the trap base and positioned to be contacted by the bail when the trap is tripped, wherein the PCB assembly is configured to identify between a "trapped tripped/pest caught" state and a "trap tripped/trap empty" state based on a presence or absence of electrical contact between the bail and the conductive strip.

12. The trap as set forth in claim 9, further comprising upwardly directed teeth on a front edge and side edges adjoining the front end of the trap base, the teeth improving rodent holding capability when the trap is tripped with rodent trapped between the bail and the trap base.

13. A snap type rodent trap with remote notification capability comprising:
a non-conductive trap base;
a snap killing mechanism including a spring-loaded bail and a trigger wire, each made of conductive material and fastened to the trap base; and
an electronic printed circuit board (PCB) assembly mounted on the base and having a layer of a flexible conductive substance selectively printed thereon, the layer of conductive substance being in electrical contact with the bail and the trigger wire to detect and report trap status states including at least trap armed and trap tripped.

14. The trap as set forth in claim 13, wherein the trap further includes a conductive strip on an upper surface of the trap base and positioned to be contacted by the bail when the trap is tripped, wherein the PCB assembly is configured to identify between a "trapped tripped/pest caught" state and a "trap tripped/trap empty" stated based on a presence or absence of electrical contact between the bail and the conductive strip.

15. The trap as set forth in claim 13, wherein the PCB assembly and layer of conductive substance are mounted on an underside of the trap base.

16. The trap as set forth in claim 15, wherein the bail and trigger wire are secured to an upper surface of the trap base by conductive fasteners embedded in the trap base, lower ends of said fasteners being in electrical contact with said flexible conductive layer on the PCB assembly.

17. A snap type rodent trap with remote notification capability comprising:
a non-conductive trap base;
a snap killing mechanism mounted on the trap base, the snap killing mechanism including a trigger element operative with a spring-loaded bail that is pivotally movable on a pivot axle from a set position to a tripped position upon activation of the trigger element, the bail when in the tripped position being spring biased toward the trap base to trap a rodent between the bail and the trap base;
an electronic printed circuit board (PCB) assembly mounted on the base, the PCB assembly detecting trap status states including "trap armed", "trap tripped/trap empty" and "trap tripped/pest caught" and transmitting said status states over a wireless network, said "trap armed" state being determined by a relationship between the bail and a component on the trap base; and
a vibration sensor mounted on the trap base, said vibration sensor generating a pulse output when the trap is tripped and the bail impacts the trap body, said PCB assembly determining whether the trap is in a "trapped tripped/pest caught" state or a "trap tripped/trap empty" state based on said pulse output.

18. The trap as set forth in claim 17, wherein the vibration sensor is a piezoelectric element secured to the trap base, said PCB assembly determining the trap is in the "trap tripped/trap empty" state in response to a number of pulses in the pulse output being greater than or equal to a threshold number indicating the bail impacted the trap body directly, said PCB assembly determining the trap is in the "trap tripped/pest caught" state in response to a number of pulses in the pulse output being less than the threshold number indicating that a pest body dampened bail impact vibration.

19. The trap as set forth in claim 18, wherein the trap includes a magnet on the bail and the component on the trap base is a magnetic sensor, a proximity of the magnet and the magnetic sensor being used to determine the "trap armed" state.

20. The trap as set forth in claim 17, wherein said bail is conductively coupled to the PCB assembly and configured to operate as an antenna for said wireless transmission of said trap status states.

21. The trap as set forth in claim 17, wherein the trigger element includes a trip pedal having a hole, said trap including a bait cup mounted on the base and accessible through the hole in the trip pedal when the trap is in the set position, an open top of the bait cup being partly covered by a bait cup cover to restrict access to bait held within the bait cup.

22. The trap as set forth in claim 17, wherein the spring-loaded bail includes a kill bar and a setting bar that are movable on the pivot axle in a fixed relationship with one another between the set position and the tripped position, the trap being set by pressing down upon the setting bar to elevate the kill bar above the trip pedal, the setting bar including a finger grip to improve user comfort and prevent finger slippage when setting the trap.

23. The trap as set forth in claim 22, wherein the trap includes a magnet embedded in the finger grip on the setting bar and the component on the trap base is a magnetic sensor, a proximity of the magnet and the magnetic sensor being used to determine the "trap armed" state.

24. The trap as set forth in claim 17, wherein the bail is a wire bar and further comprising upwardly directed teeth on a front edge and side edges adjoining the front edge of the trap base, the teeth improving rodent holding capability when the trap is tripped with a rodent trapped between the bail and the trap base.

25. The trap as set forth in claim 24, wherein the trigger element includes a trip pedal, said pedal being provided with an additional set of upwardly directed teeth.

\* \* \* \* \*